April 23, 1974     C. C. RIPLEY     3,806,410

NUCLEAR FUEL ASSEMBLY SPACER

Filed Oct. 31, 1968     8 Sheets-Sheet 1

INVENTOR:
CHARLES C. RIPLEY

BY: John R. Duncan
ATTORNEY

April 23, 1974 C. C. RIPLEY 3,806,410
NUCLEAR FUEL ASSEMBLY SPACER
Filed Oct. 31, 1968 8 Sheets-Sheet 2
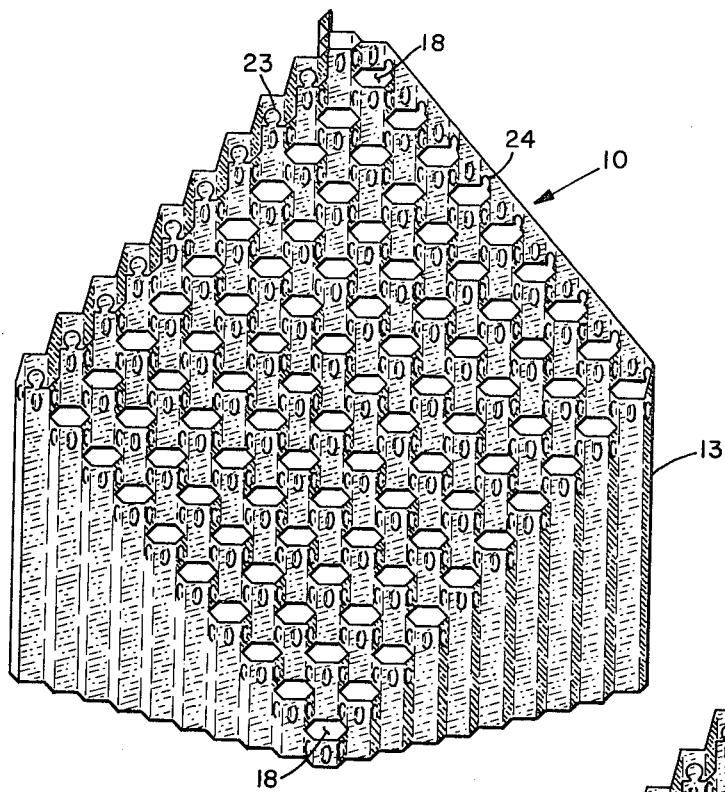
Fig. 3
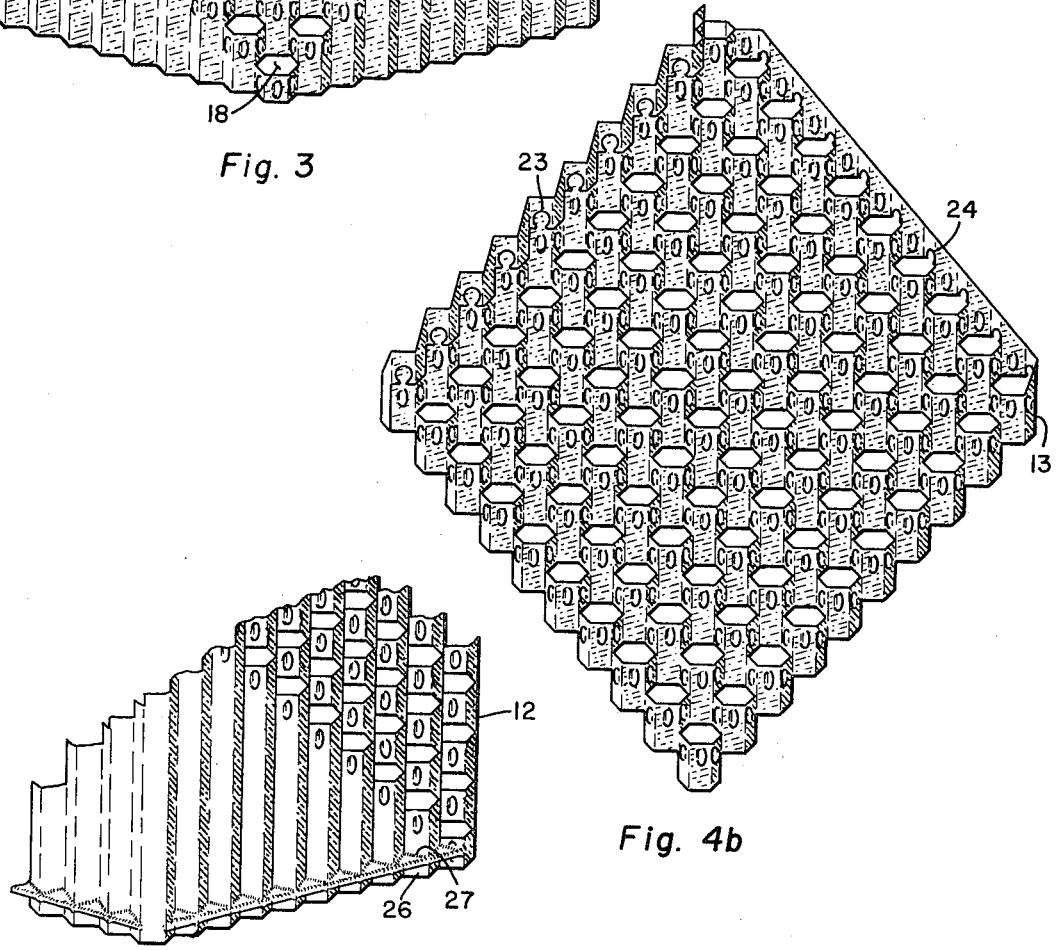
Fig. 4a
Fig. 4b April 23, 1974 C. C. RIPLEY 3,806,410
NUCLEAR FUEL ASSEMBLY SPACER
Filed Oct. 31, 1968 8 Sheets-Sheet 5

April 23, 1974  C. C. RIPLEY  3,806,410
NUCLEAR FUEL ASSEMBLY SPACER

Filed Oct. 31, 1968  8 Sheets-Sheet 7

3,806,410
NUCLEAR FUEL ASSEMBLY SPACER
Charles C. Ripley, 958 Kingfisher Drive,
San Jose, Calif. 95124
Filed Oct. 31, 1968, Ser. No. 772,206
Int. Cl. G21c 3/34
U.S. Cl. 176—78                                                 11 Claims

ABSTRACT OF THE DISCLOSURE

An expanded sheet spacer for nuclear fuel rod assemblies is disclosed. The spacer consists of a single sheet which contains a pattern of slits which permit portions of the sheet adjacent the slits to be displaced successively in the same direction to form a plurality of parallel fuel rod receiving channels.

BACKGROUND OF THE INVENTION

Nuclear chain fission reactions and the reactors in which they take place are now well known. A typical reactor includes a chain reacting assembly or core made up of nuclear fuel material contained in fuel elements. The fuel material is generally encased in a corrosion resistant heat conductive shell or cladding. The reactor core, made up of a plurality of these elements in spaced relationship, is enclosed in a container through which the reactor coolant flows. As the coolant passes between the spaced fuel elements, it is heated by thermal energy released in the fuel material during the fission reaction. The heated coolant then leaves the reactor, the thermal energy is used to perform useful work and the now-cooled coolant is recycled back to the reactor.

In modern water cooled commercial reactors, such as those described in U.S. Pat. No. 3,029,197, the core is generally made up of a plurality of sub-assemblies or bundles, each of which consists of a plurality of rod-shaped fuel elements held in a spaced parallel relationship. Typically a bundle may contain 49 fuel rods having a diameter of about 0.5 inch and a length of about 12 feet. The rods are maintained in the desired arrangement by tie plates at each end and several lateral spacing and support means along the bundle length. In fast breeder type reactors, each bundle may contain as many as 750 rods, each having a diameter of 0.25 inch or less. Maintaining this number of very thin rods in the desired parallel array is especially difficult.

Spaced fuel rods located within a bundle may experience different rates of heat generation and resulting locally different temperatures. This condition may be the result of flux peaking in adjacent coolant channels, unequal distribution of coolant flow through the core, presence of adjacent structural material and the like. Accordingly, the spaced fuel rods are subject to unequal thermal expansions so that unless restraining means are provided the rods and bundles are subject to deformation or bowing. This may cause local hot spots where adjacent rods touch resulting in the decomposition or melting of the clad material. This may lead to the formation of cracks or openings in the clad which directly expose the fuel and fission product gases contained within the fuel rod to the coolant. When this occurs, not only must the fuel elements be replaced, requiring shutdown of the reactor, but the coolant will be contaminated with radioactive material. Also, severe bowing of peripherally located fuel rods may interfere with control rod movement.

Therefore, the intermediate spacers must have sufficient strength to prevent rod bowing due to temperature variations. In addition, the spacer must have sufficient strength to resist severe thermal and hydraulic forces which vary greatly between reactor starting conditions and hot full power operating conditions.

On the other hand, excessively large and sturdy spacers may detrimentally affect reactor performance. If the spacer locally restricts coolant flow, local hot spots may occur causing local cladding failure as described above. The spacer should be as small as possible and have a low absorption cross-section for neutrons so as to minimize "parasitic absorption." This absorption becomes significant where a great many spacers are required in the core. Desirably, the spacers are fabricated from a material, such as a zirconium alloy, which has low neutron absorption and sufficient strength.

Spacers which are complex and difficult to fabricate are undesirable, since a great many spacers are required in a single core and preferred materials, such as zirconium are difficult to fabricate in complex shapes. Similarly, spacer designs requiring a great many welds are difficult to consistently fabricate within the necessary tolerances.

If the contact area between the spacer and each fuel rod is too great, coolant flow to that area may be restricted, resulting in a hot spot. Conversely, if the contact area is too small, differential thermal expansion and vibrations induced by coolant flow may cause fretting damage to the clad at the contact point. Eventually, the damaged surface may crack, allowing the coolant to contact the fuel within the rod. In addition, loading fuel rods into a tight-fitting spacer may scratch or otherwise damage the surface of the rods.

Thus there is a continuing need for improved fuel rod assembly spacing and support means

SUMMARY OF THE INVENTION

It is, therefore, an object of this invention to provide a nuclear fuel assembly spacer overcoming the above-noted problems.

Another object of this invention is to provide a nuclear fuel assembly spacer which is simple and inexpensive to fabricate.

Another object of this invention is to provide a nuclear fuel assembly spacer having an optimum balance of high strength and low parasitic absorption.

Still another object of this invention is to provide a nuclear fuel assembly spacer into which fuel rods may be easily loaded without surface damage to the rods.

Yet another object of this invention is to provide a nuclear fuel assembly spacer of improved coolant flow guiding characteristics.

The above objects, and others, are accomplished in accordance with this invention by providing a nuclear fuel assembly spacer comprising an expanded sheet structure containing a plurality of short slits spaced along spaced parallel lines. Preferably, a small round stress relieving hole is formed at the end of each slit. The length of each slit is at least about 2 times the length of the space along the line between the ends of adjacent slits. Portions of the sheet below the center of each slit are all displaced in the same direction away from the original plane of the sheet. A plurality of channels having axes substantially parallel to each other and to the original plane of the sheet result. Each channel has an approximately hexagonal or square cross section. Preferably, at least several of the walls of each channel are dimpled inwardly, to support a rod projecting through the channel out of general contact with the walls of the channel.

In a preferred embodiment, the length of each slit is about 3 times the distance between the ends of adjacent slits, and the center of the slits in one row are adjacent the center of the inter-slit space in the next row. This configuration results in the formation of channels each having a hexagonal cross-section. This is especially advantageous, since three inwardly projection dimples may be provided, in every-other wall of each hexagonal channel to support the fuel rod. The 3 walls of the channel which do not have an inwardly projecting dimple have an outwardly projecting dimple projecting into the next channel. Thus, back-to-back dimples in a single wall are never required. Back-to-back dimples are disadvantageous, since they will resist flexing as fuel rods thermally expand in diameter because they form a substantially rigid connection between adjacent fuel rods. The arrangement of single dimples provided in the hexagonal channels according to this invention will permit flexing of the channel walls to accommodate thermal expansion.

The one-piece multi-channel spacer thus produced may then be subdivided, or the outer edges may be trimmed, to produce a spacer which will hold a plurality of fuel rods in the desired manner. For example, the spacer may be trimmed to a hexagonal or rectangular overall shape.

In an especially preferred embodiment, the spacer may be trimmed to a shape corresponding to ⅓ of a hexagon. Three such spacers may be joined together to form a hexagonal bundle having desirable flow characteristics, as is further discussed below.

DETAILED DESCRIPTION OF THE INVENTION

Details of the invention and of the preferred embodiments thereof will be further understood upon reference to the drawings wherein:

FIG. 3 is an isometric view of one section of the spacer shown in FIG. 1, seen from the viewpoint indicated by line 3—3 in FIG. 1;

FIG. 4a is an isometric view of one section of the spacer shown in FIG. 1 showing a modification thereof;

FIG. 4b is an isometric view of a portion of the spacer shown in FIG. 1, showing a second modification thereof;

Figure 1:
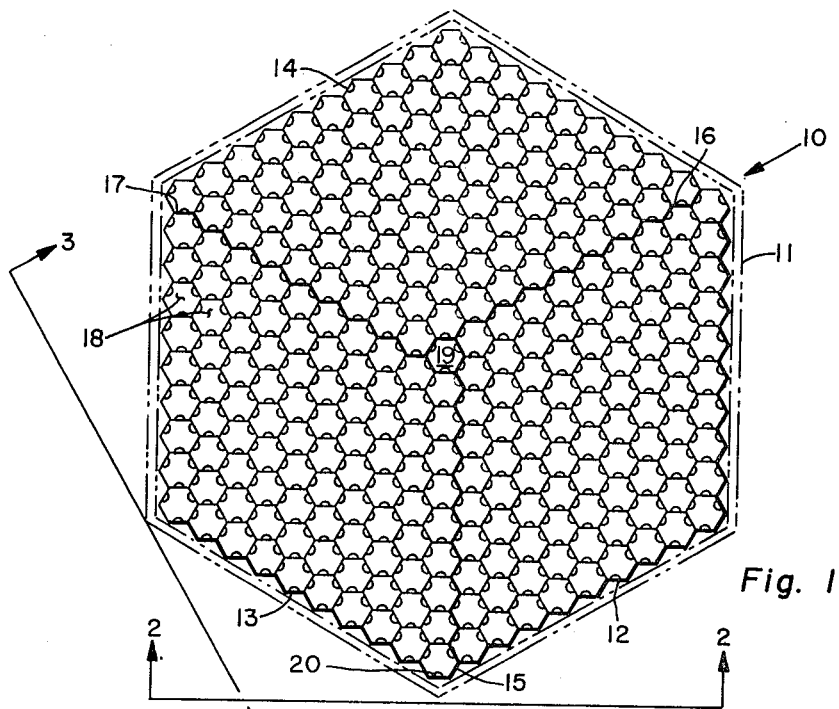
FIG. 1 is a plan view of a spacer according to this invention.

Referring now to FIG. 1 there is seen a spacer according to this invention which is suitable for supporting a plurality of nuclear fuel rods in hexagonal array. The spacer, generally designated 10, is adapted to be positioned within an elongated hexagonal shroud, generally indicated by broken lines 11. Spacer 10 is made up of three indentical segments or sections 12, 13 and 14 with each of the numbers also representing one of a plurality of parallelly spaced regularly deformed wall portions with each wall portion being displaced in a tiered manner from the adjacent wall portion. The dividing lines between sections are symbolically indicated by heavy black lines 15, 16 and 17 in FIG. 1. Adjacent spacer sections are joined together, such as by welding, along these lines 15, 16 and 17. Each of sections 12, 13 and 14 is formed, as described in detail below, from a single sheet of metal. The forming operation produces a plurality of generally hexagonal parallel openings 18. The center fuel rod opening 19 is formed by the outer walls of each section where they come together at the center of the assembly.

Figure 2:
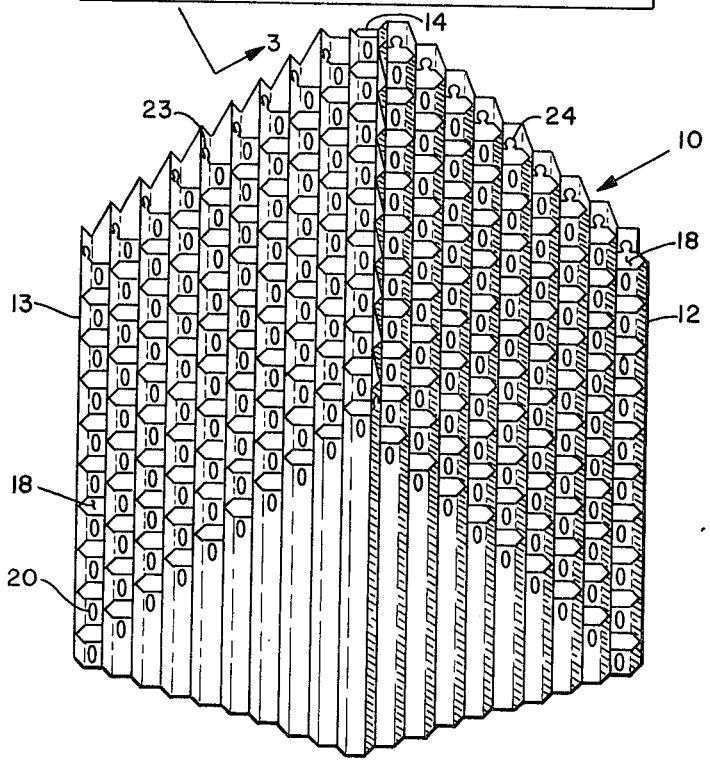
FIG. 2 is an isometric view of the spacer shown in FIG. 1, seen from the view point indicated by line 2—2 in FIG. 1.

As best seen in FIGS. 1 and 2, small centering dimples 20 are provided in the wall portions (e.g. 12, 13 and 14) of each fuel rod opening. Each opening has three spaced dimples to assure correct positioning. As seen in FIG. 2, the longer fuel openings may have dimples at each end, if desired.

FIG. 2 shows an isometric view of the fuel assembly taken from the direction indicated by line 2—2 in FIG. 1. Thus, FIG. 2 shows two full spacer sections, namely sections 12 and 13. When positioned in a reactor core with the spacer apex upward, flow through the spacer will be slightly redirected away from the shroud walls towards the center of the assembly since there is a generally pyramidal cavity extending up into the bottom of the spacer conforming in shape to the spacer apex as seen in FIG. 2. It is generally desirable to increase flow through the center of the fuel bundle since the center fuel rods generally have the highest heat output.

As seen in FIG. 2 and 3, the spacer sections may be conveniently secured together by means of a row of tabs 23 along one edge of each spacer section which meet with a corresponding row of cutouts 24 in the adjacent wall. Thus, when the spacer sections are assembled as seen in FIG. 1, the tabs 23 of one section will fit into cutouts 24 in the next adjacent section. The tabs may be secured in place such as by welding. Thus, the wall thickness between adjacent spacer sections is not increased.

FIG. 3 shows an isometric view of the spacer taken in the direction shown by line 3—3 in FIG. 1. Thus, FIG. 3 shows a view of a single spaced section 13.

FIGS. 4a and 4b show details of modifications to portions of the spacer section shown in FIG. 3. FIG. 4a shows an alternate skirt form in which a reinforcing band 26 is formed along and as part of the lower edge of the spacer section. The reinforcement is produced by die forming this edge after the channels have been formed. The space between band 26 and the wall of the sector is thus filled with outwardly projecting fillets 27 formed from the spacer material. This alternate arrangement serves to reinforce the spacer and to additionally direct coolant flow away from the shroud wall and towards the center of the fuel bundle.

FIG. 4b shows a second alternate arrangement corresponding to the view seen in FIG. 3, in which the lower edge of the spacer section is cut away and is stepped up in a manner corresponding to the upper surface of each fuel rod opening. This alternative decreases the amount of parastitic neutron absorbing material included in the spacer. Of course, if desired, a reinforcing band such as is shown in FIG. 4a could be incorporated into the embodiment shown in FIG. 4b. This configuration aids in directing coolant flow from along the shroud wall towards the center of the fuel assembly. The size of each opening 18 is about three times the distance between adjacent openings on the visual line of openings formed between each pair of adjacent wall portions as shown in FIGS. 2, 3 and 4.

Figure 5:
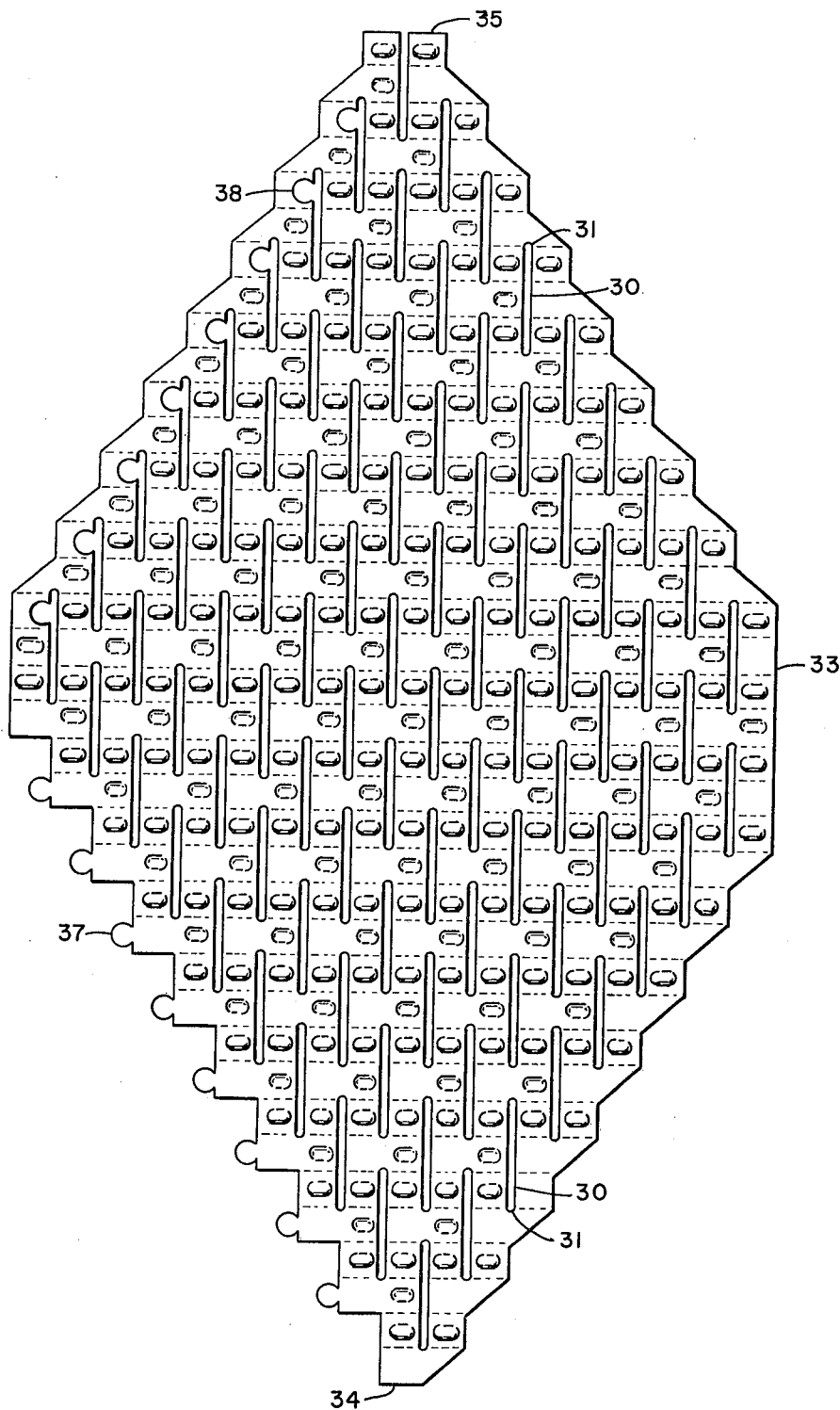
FIG. 5 is a plan view of a preform from which the spacer shown in FIG. 1 is formed.

Each of the spacer sections shown in FIGS. 1–4 is formed from a single flat metal sheet. FIG. 5 shows such a sheet from which a spacer section such as is shown in FIG. 4b may be formed.

The preform shown in FIG. 5, when deformed as described below, will result in a spacer corresponding to one section of the combination spacer shown in FIG. 1 with the lower edge modified as shown in FIG. 4b. The preform is cut from a sheet of suitable metal, such as a zirconium alloy or a stainless steel, typically having a thickness of about 10 mils. The preform and the various openings therein may be cut by any suitable shearing, die-cutting or chemical etching type operation.

Figure 13:
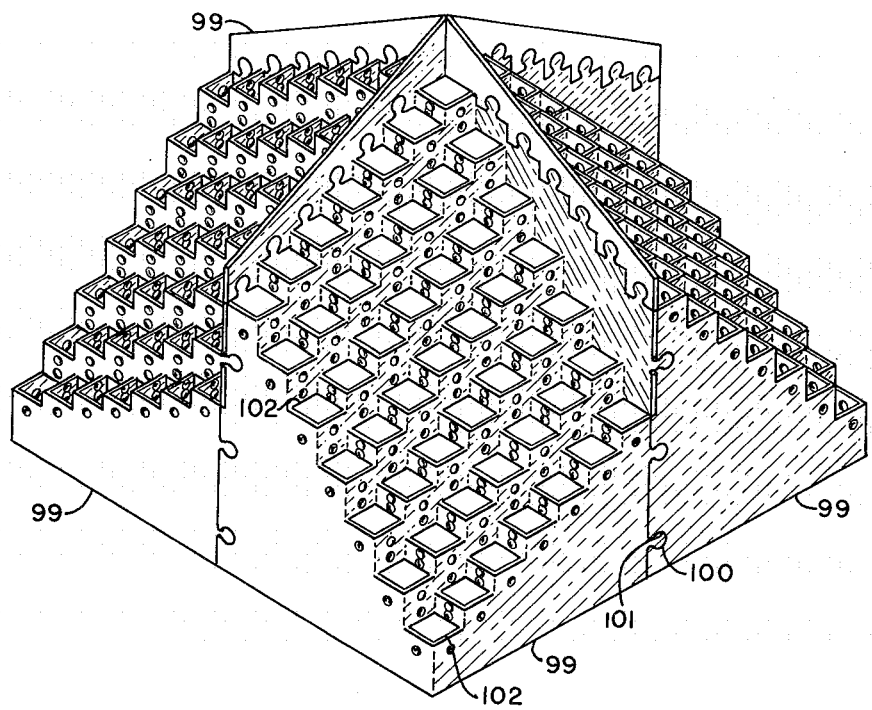
FIG. 13 is an isometric view of an alternative embodiment of the spacer shown in FIG. 1.

The outline of the preform will vary depending upon the desired shape of the spacer to be produced, e.g. hexagonal, triangular or rectangular. All hexagonal channel spacers will have the same pattern of slits 30 formed over the surface thereof. These slits 30 are arranged on parallel lines with each slit having a length substantially equal to three times the space between adjacent slits along a given line. Where a pattern of square-shaped channel openings is to be formed (as shown in FIG. 13, below) slits 30 will have a length equal to twice the space between adjacent slits. In each case each slit will be aligned with the inter-slit space on the lines above and below the given line.

Desirably, slits 30 have rounded ends 31 to minimize stress accumulations. Where the slits are relatively wide, as shown in FIG. 5, the ends need merely be rounded as shown. Where the slits are formed by merely cutting along the line and not removing material, it is desirable that small round holes be formed at the ends of the slits.

As seen in FIG. 5, the lower edge of the preform steps upwardly, alternating between diagonal and horizontal steps, so that the resulting spacer will have the configuration shown in FIG. 4b. To produce the lower edge configuration shown in FIGS. 1–3, the lower edge of the preform would be a straight line extension of lower edge 33, forming right angles with lines extended downwardly from lines 34 and 35.

The upper edge of the preform is stepped upwardly and inwardly so that the spacer will have the configuration shown in FIGS. 1–3. While the spacer sections may be secured together in any desirable manner, the tabs 37 and openings 38 provide an especially preferred multi-part spacer assembly system. As seen in FIG. 1, the tabs 37 on one spacer section fit into openings 38 on the next adjacent spacer section. The tabs may be secured to the opening edges by any suitable method, such as welding. Thus, only a single sheet of material is present between adjacent spacer sections because of the interlocking nature of the assemblies.

Preferably, dimples 40 are provided in the walls of each individual fuel rod holding channel to hold the fuel rod out of general contact with the channel wall. As seen in FIG. 1, the dimples may be formed so that every other wall of a given hexagonal channel has an inwardly projecting dimple. Thus, each fuel rod is supported by three equally spaced dimples. Since there are never two dimples in the same planar wall, back-to-back, the channels may flex slightly as the fuel rods expand. The next adjacent fuel rod channel suffers no adverse dimple pressure against its own rod. Also, the dimples are located in different horizontal planes (that is, planes perpendicular to the centerline of the fuel bundles) so that a slight twisting of the channel walls may take place during fuel expension.

As is apparent, this preform may be easily and simply fabricated using modern die-cuting techniques. The configuration of the outer edges of the preform may be widely varied depending upon the ultimate outer shape of the desired spacer. The dimples may be formed by a single die pressing operation between mating dies, with certain dimples projecting upwardly and others downwardly from the plane of the preform. The preform is then reshaped into the spacer configuration by simple die pressing techniques.

Figure 6:
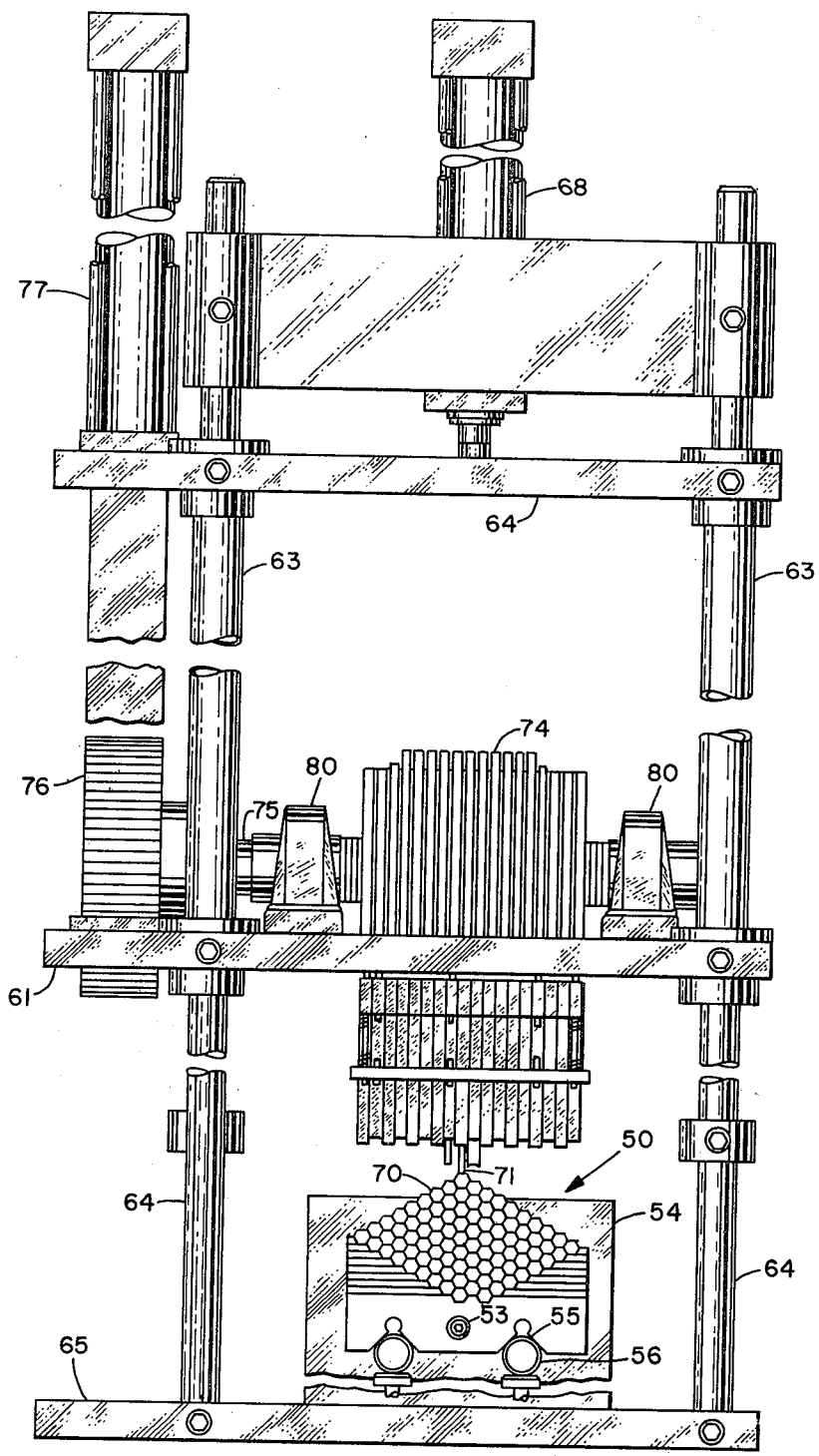
FIG. 6 is a front elevation view of a machine for forming the spacers of this invention.
Figure 7:
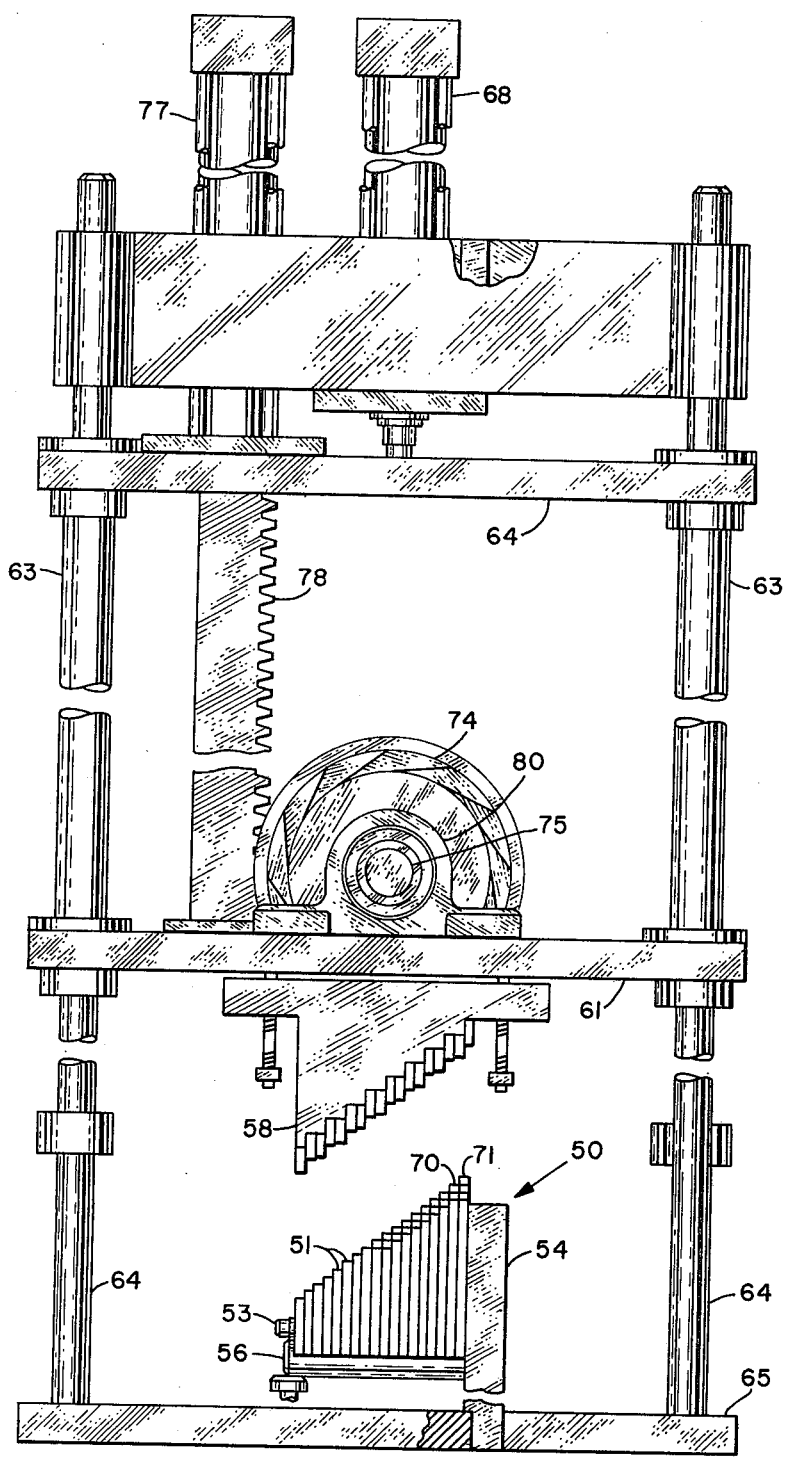
FIG. 7 is a side elevation view of the machine shown in FIG. 6.

FIGS. 6 and 7 show front and side elevation views of a typical die pressing machine useful in forming a preform such as shown in FIG. 5 into a spacer section such as that shown in FIG. 3.

Preferably, the preform is first roughly shaped by stretching the preform between gripping points along the upper and lower edges in the manner in which expanded metal mesh is formed. This stretching operation will open the slits into rounded openings approximating the hexagonal openings ultimately to be produced.

As seen in FIGS. 6 and 7, the spacer is formed between a lower die assembly 50 made up of a plurality of aligned plates, which conforms to the shape of the desired spacer. Plates 51 are held in alignment by a bolt 53 which passes through plates 51 and a backing plate 54. A pair of upwardly projecting V-shaped notches 55 rest on a pair of cylindrical support members 56. This engagement between notches 55 and cylinders 56 assures proper alignment between die assembly 50 and the remainder of the machine whenever die assembly 50 is removed and replaced.

Figure 11:
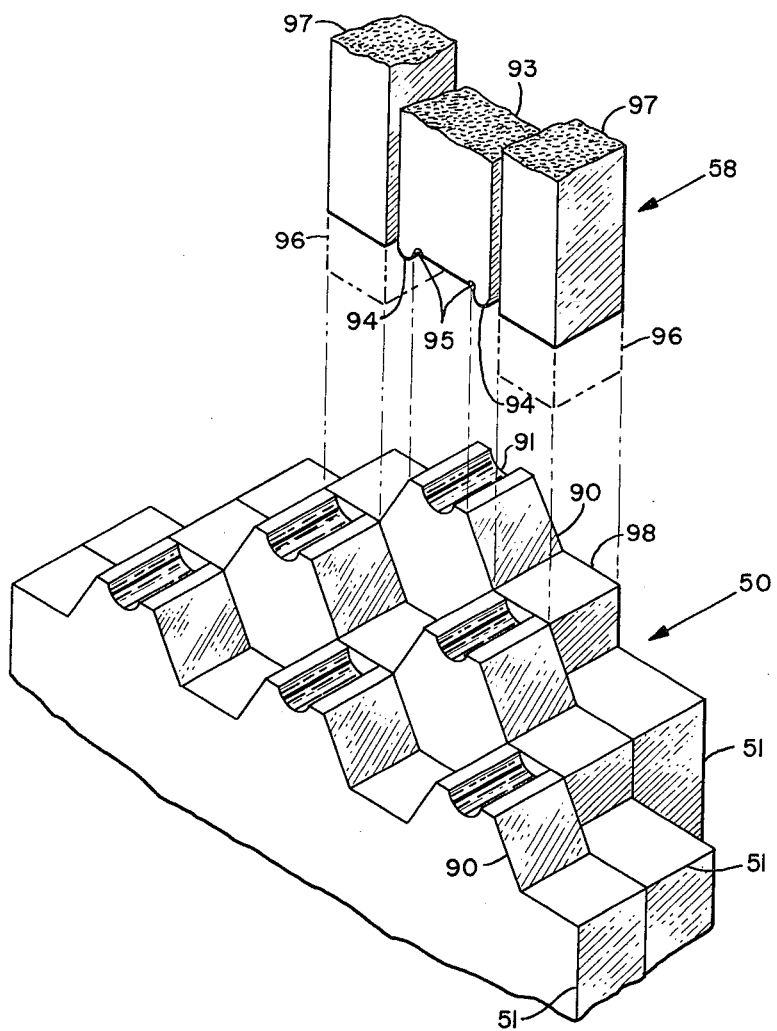
FIG. 11 is an isometric view of a portion of the machine shown in FIGS. 6 and 7 detailing the sheet forming means.
Figure 12:
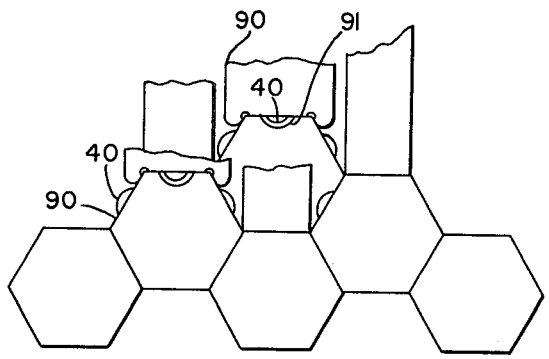
FIG. 12 is an elevation view of a portion of the cam and support sheet forming means.

A plurality of cooperating punches 58 are located above die assembly 50 to sequentially press the preform against portions of the die assembly to form the spacer. Details of the punches and die assembly are shown in FIGS. 11 and 12, below. Each of the punches 58 is biased upwardly by springs 59 mounted on rods which extend from bar 60 upwardly through the individual punches 58 to support member 61. Thus, the entire array of punches 58 depends from support member 61 in a manner which permits one or more of the punches 58 to be pushed downwardly against die assembly 50.

Support bar 61 is mounted on a frame including tubular members 63 surrounding vertical supports 64 which are secured to a base 65 on which die assembly 50 is mounted. The upper end of tubular members 63 are secured to a cross member 67 which is connected to hydraulic cylinder 68. Thus, hydraulic cylinder 68 is adapted to raise and lower the entire assembly including the array of punches 58. After the preform is placed over die assembly 51, hydraulic cylinder 68 is actuated to lower the assembly until the upper center portion 70 of die assembly 51 engages the center punch 71 of punch array 58. This serves to hold the preform firmly in position.

The remaining punches 58 are then sequentially brought downwardly against the preform to press it into contact with die assembly 51 to form the spacer. This sequential operation is caused by a plurality of cams 74 fixed to and rotatable with a shaft 75 rotated by a spur gear 76 driven by an hydraulic cylinder 77 through a rack 78. Pillow blocks 80 mounted on support member 61 support shaft 75 for rotation.

Figure 8:
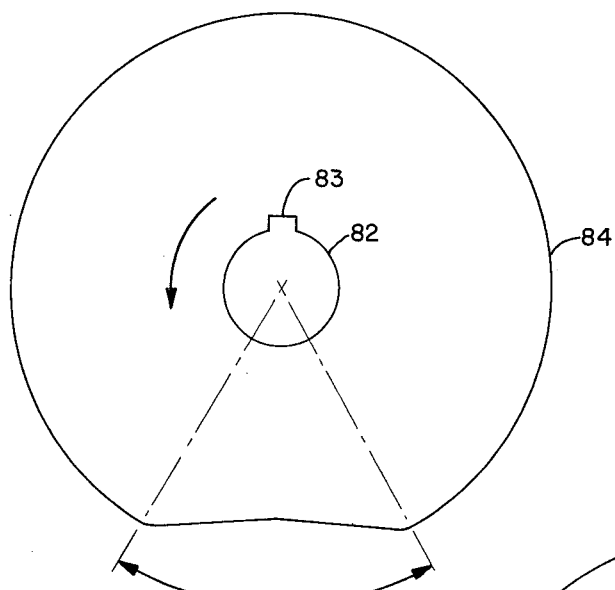
FIGS. 8, 9 and 10 show typical cams for use in the machine shown in FIGS. 6 and 7.
Figure 9:
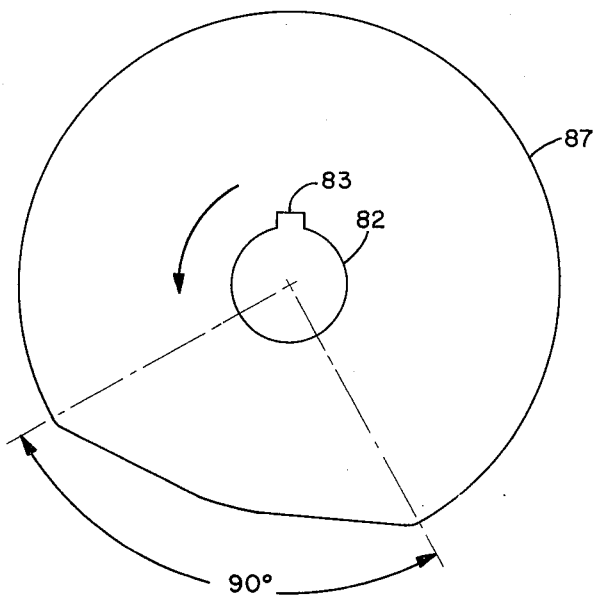
Figure 10:
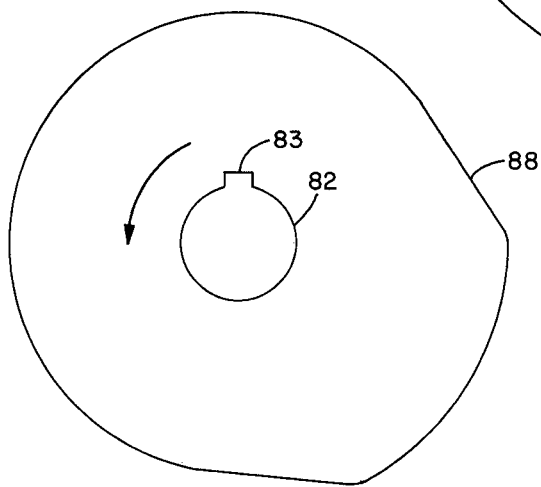

As shown in detail in FIGS. 8–10, the cams 74 are shaped so that they sequentially press down punches 58 from the center outwardly. Thus, at the completion of the spacer forming sequence, all of the punches 58 are in engagement pressing the preform against the die assembly 51. The preform is released by raising rack 78 and/or raising the assembly made up of support member 61, tubular member 63 and cross bar 64 by means of hydraulic cylinder 68. The shaped spacer section is then removed and the above-described sequence repeated with another preform.

FIGS. 8, 9 and 10 show side views of three typical cams useful as part of cam array 74 for actuating punches 58. Each of the cams has an opening 82 through which shaft 75 passes. Key ways 83 are provided for a key which locks the cam to shaft 75. The cams shown in FIGS. 8, 9 and 10 are typical of the many cams which would be used in this machine. The cams shown on FIG. 8 have a generally cylindrical surface 84 over all but a small portion of the circumference. Cams having this configuration would be located on both sides of the center, near the center of the cam array. As this cam rotated the punch would be pressed down when point 86 engaged the punch. The punch would be held in engagement with die assembly 51 throughout approximately 270° of the rotation of shaft 75. The next pair of cams outwardly adjacent the cams shown in FIG. 8 would have a configuration such as shown in FIG. 9. Here a larger portion of the cam surface projects inwardly from the generally cylindrical surface 87. As this cam rotated together with that shown in FIG. 8, first the punches engaged by cams of FIG. 8 would be depressed then those engaged by the cams shown in FIG. 9 would shortly thereafter be depressed. Additional cams having cylindrical surfaces of lesser extent would sequentially press down the other punches beginning at the center of the array and working outwardly. A typical cam which might drive the outermost punches is shown in FIG. 10. As seen in this figure, the cylindrical surface extends only over a small portion of the cam surface. Thus, as can be seen in FIG. 10, this cam would rotate approximately 270° before the corresponding punches were depressed as point 88 reached the punch surface. These cams are merely typical of the many designs which could be used in cooperation with a punch array. It is merely necessary that the cams actuate the punches in order to sequentially form portions of the spacer.

Details of the cooperative relationship between punch assembly 58 and die assembly 50 will be seen in FIG. 11 which shows an isometric view of a portion of the machine shown in FIGS. 6 and 7. As seen in FIG. 11, each of the raised portions 90 have a depression 91 formed in the upper surface thereof to receive the dimples 40 in the preform and prevent distortion thereof. Each of the plates 51 which make up die assembly 50 can be produced by conventional machining techniques. Each of the punches 93 which engage a raised portion 90 have a flat surface which engages the upper portion of raised portion 90 and two lips 94 to form the channel corners. Punches 93 are cut away slightly at the corner 95 to prevent direct pressure on the preform at the corner of raised portion 90. The punches 97 which engage those portions of die 50 adjacent raised portions 90 have a flat face directly engaging faces 98 on die member 50. Thus, as the cams actuate the punches, first punch 93 is brought into engagement with lips 94 bending the preform around the corners of raised portion 90 and holding the preform thereagainst. Then punches 97 are brought into engagement pressing the preform down against flat faces 98. Broken lines 96 symbolically show the forward travel of punches 97 relative to punch 93, after punch 93 has engaged raised portion 90. This operation continues in sequence with additional similar punches until the entire spacer is formed.

Details of the engagement of the spacer preform with the punch and die array is further detailed in FIG. 12, which shows an elevation view of a portion of the punch and die assembly. As seen in FIG. 12, preform 29 has been shaped to conform to the upper surface of die assembly 50. Downwardly extending dimples 40 extend into depressions 91 and raised portions 90 of the die assembly. Upwardly projecting dimples 40 rest on the angled walls of upward projections 90 between punches 93 and 97. Thus, the spacer is sequentially formed by the sequentially operated punches without deforming the dimples 40.

While the above described machine and method for forming the spaces of this invention is efficient and reliable, any other suitable system may be used if desired. Of course, the form of the punches and dies may be varied widely depending upon the spacer configuration desired.

An alternative embodiment of the spacer of this invention, especially suitable for use where the fuel assembly is in a square array, is shown in FIG. 13. Here, the assembled spacer is made up of four symmetrical spacer sections 99. The fuel rod receiving openings are square in cross section rather than hexagonal. Preferably dimples (not shown) will be formed in each wall portion of each fuel rod receiving channel so that four dimples project into each channel, one from each of the four wall portions. An arrangement of corresponding tabs 100 and openings 101, such as are described above, are provided for securing the spacer sections together. These spaces may be formed in a machine such as that shown in FIGS. 6 and 7, with the punches and dies modified to form the square rather than hexagonal channel openings 102. The size of each opening 102 is about two times the distance between adjacent openings on the visual line of openings formed between each pair of adjacent wall portions for FIG. 13.

Figure 14:
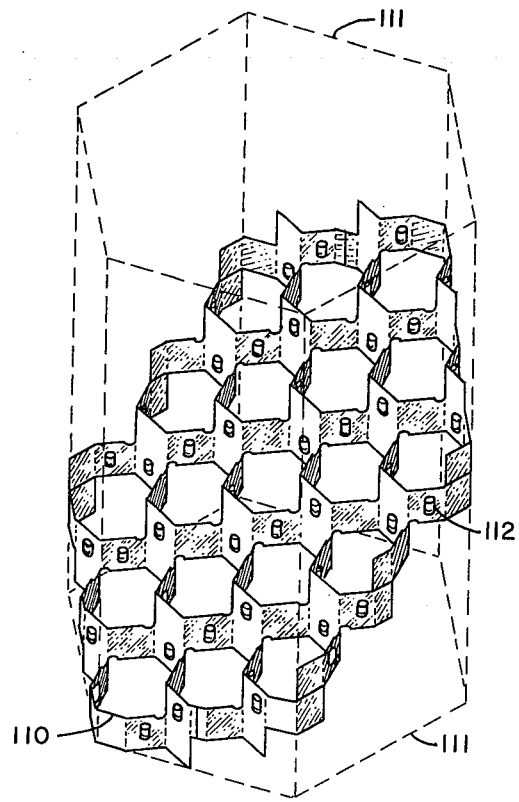
FIG. 14 is an isometric view of a second alternative embodiment of the spacer.
Figure 6:
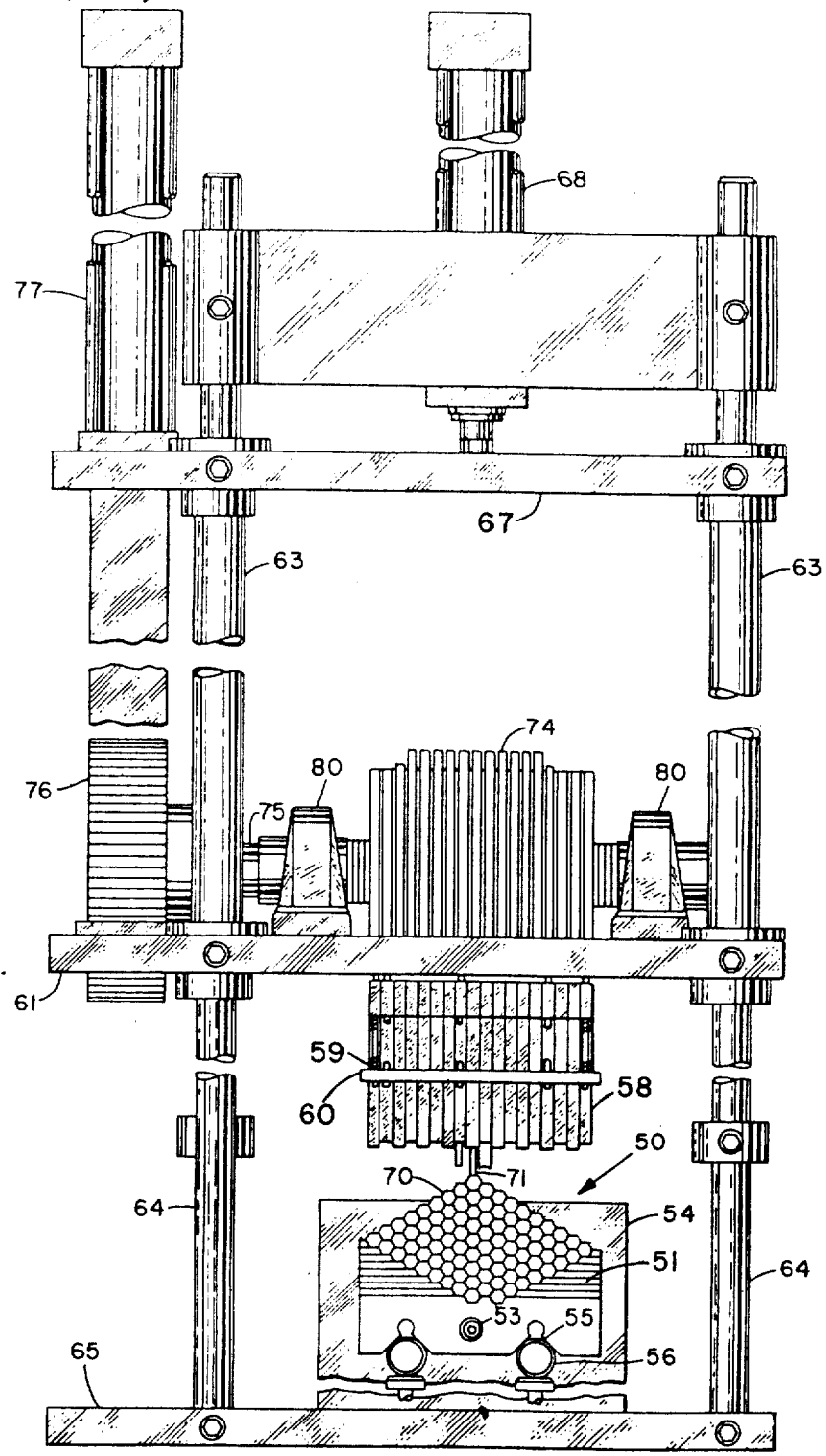
Figure 7:
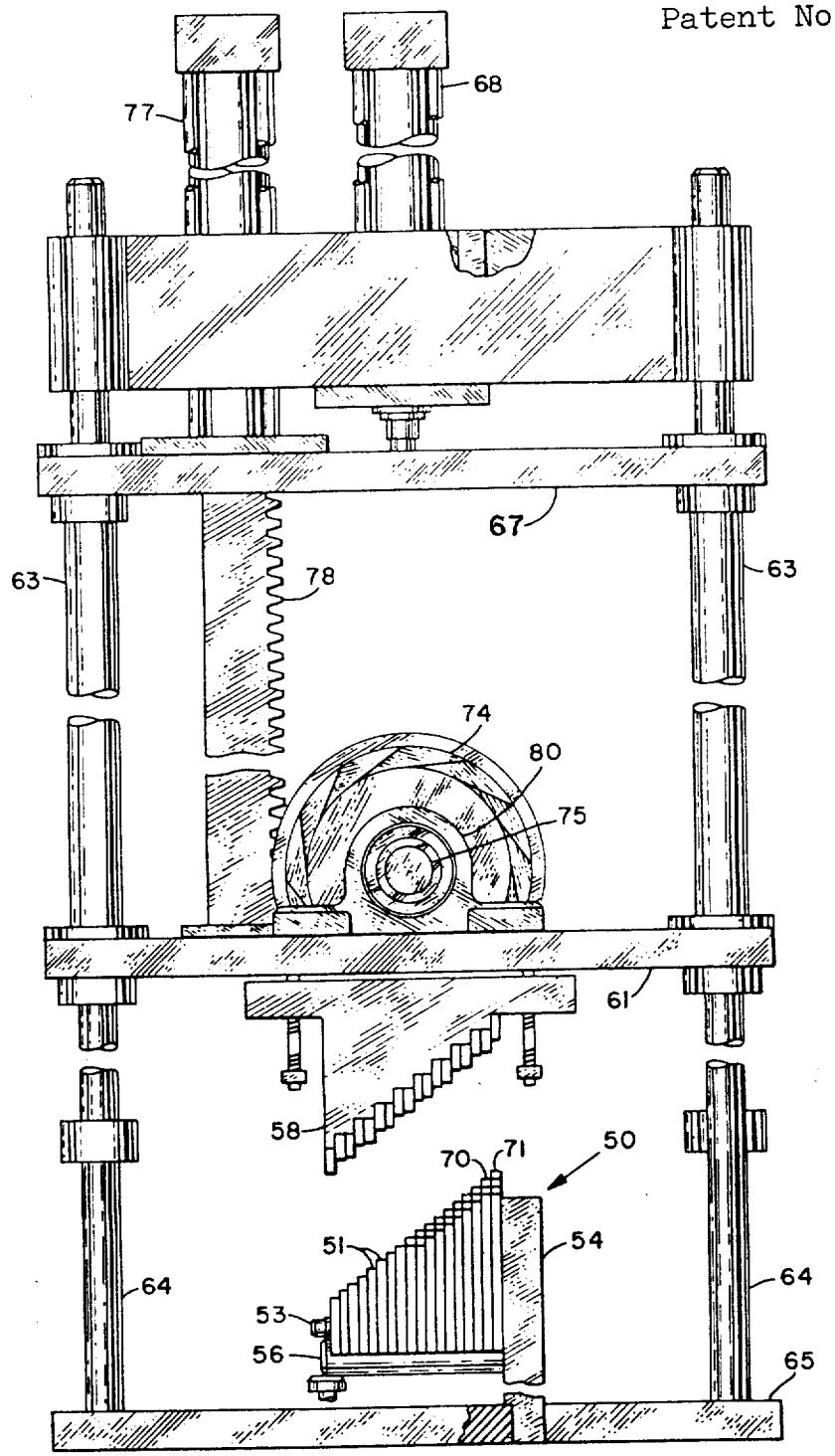
Figure 8:
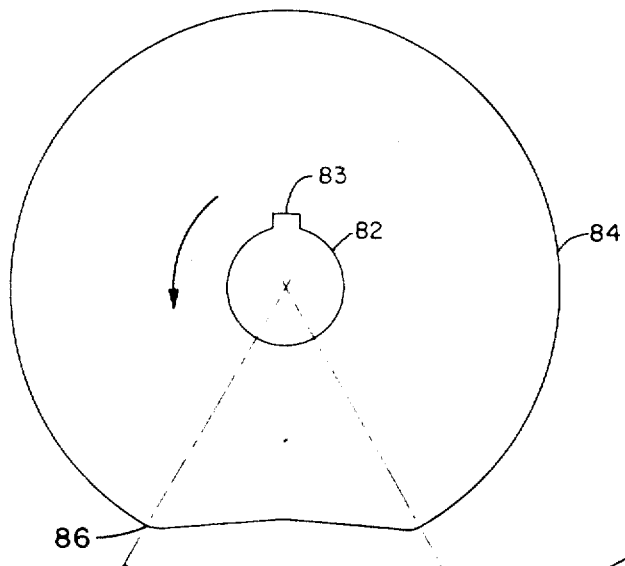
Figure 9:
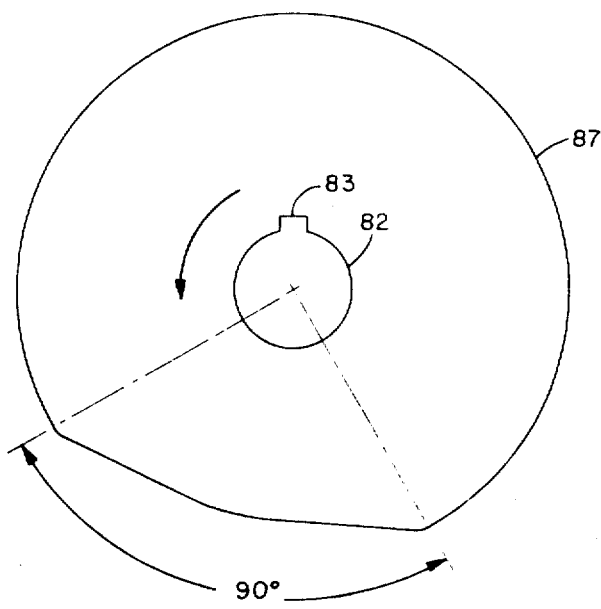
Figure 10:
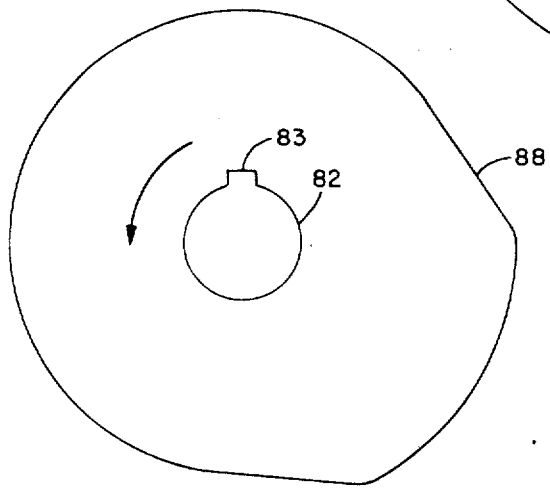
Figure 11:
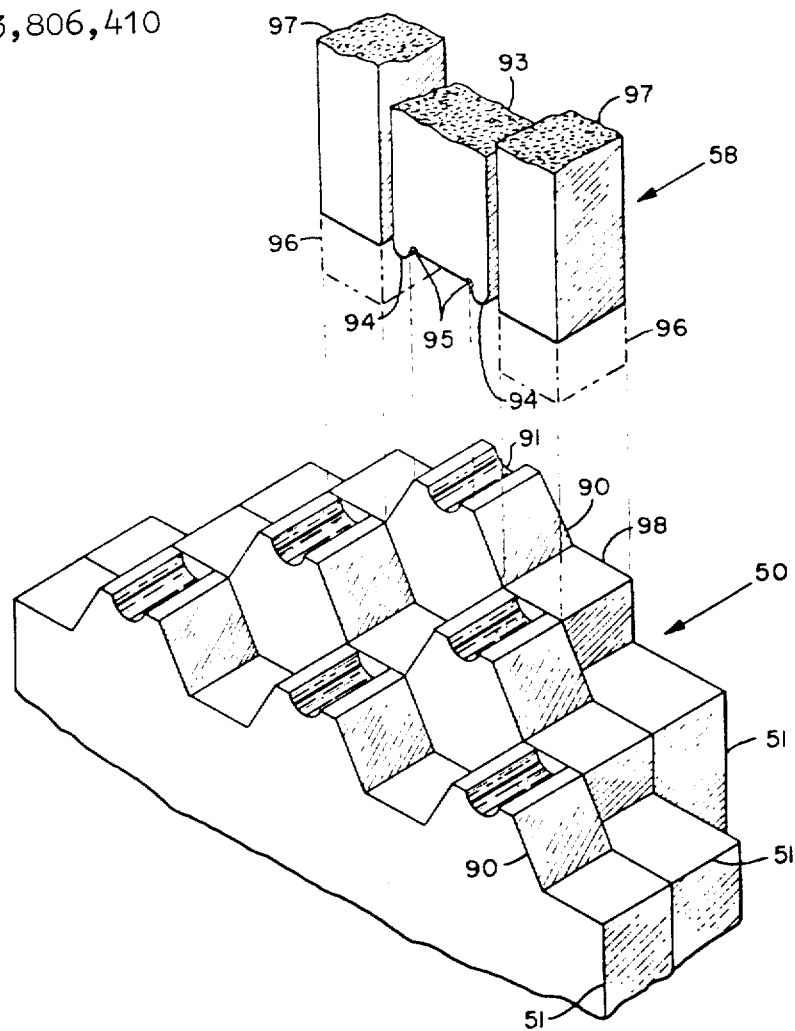
Figure 12:
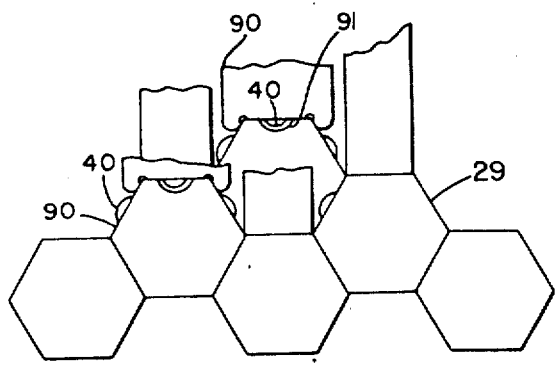

Another alternative embodiment of the spacer of this invention is shown in FIG. 14. In this embodiment, a single spacer having a plurality of hexagonal fuel rod receiving channels 110 is formed to fit within a hexagonal fuel assembly shroud generally indicated by broken lines 111. Dimples 112 project into each channel 110. The spacer shown in FIG. 14 adds a minimal amount of neutron absorbing material in the spacer. This spacer is formed as described above, with the preform trimmed to produce the generally hexagonal configuration. Many other variations on the basic spacer of this invention will occur to those skilled in the art to meet particular requirements and circumstances.

Although specific arrangements and proportions have been described in the above description of typical embodiments, a wide variety of arrangements and designs may be used as indicated above with similar results.

Other modifications and ramifications of the present invention will occur to those skilled in the art upon reading the present disclosure. These are intended to be included within the scope of this invention.

I claim:

1. A spacer capable of supporting a plurality of nuclear fuel rods in a nuclear reactor comprising
   (a) an expanded one-piece sheet structure with a plurality of parallelly spaced regularly deformed wall portions, each wall portion being displaced in a tiered manner from the adjacent wall portion;
   (b) each pair of adjacent wall portions defining therebetween a plurality of spaced openings which form a visual line;
   (c) each opening having a size of at least about 2 times the distance between adjacent openings on the line; and
   (d) portions of said wall portions in front of each opening are displaced in one direction perpendicular to the plane of the wall portion and portions of said wall portions in back of each opening are displaced in a direction opposite said one direction forming a plurality of channels from the adjacent wall portions having axes substantially parallel to each other capable of receiving and laterally supporting said fuel rods.

2. The spacer of claim 1 wherein the size of each opening is about three times the distance between adjacent openings on the line, and each of said channels has a substantially hexagonal cross section.

3. The spacer of claim 2 further including a plurality of dimples in said sheet projecting into said channels, each hexagonal channel having three equally spaced dimples, each wall having a single dimple projecting in a single direction.

4. The spacer of claim 3 wherein said dimples lie in more than one horizontal plane, said horizontal planes taken perpendicular to the axis of said channels.

5. The spacer of claim 4 wherein said spacer has an overall configuration on a plane perpendicular to the axis of said channels, of substantially one third of a hexagon.

6. The spacer of claim 5 wherein three of said spacers are secured together to form a single larger spacer having a substantially hexagonal cross section on a plane perpendicular to the axis of said channels.

7. The spacer of claim 6 wherein at least one small strain relief hole is removed from the sheet structure defining the openings.

8. The spacer of claim 1 wherein the size of each opening is about two times the distance between adjacent openings on the line and each of said channels has a substantially square cross section.

9. The spacer of claim 8 further including a plurality of dimples in said sheet projecting into each channel.

10. The spacer of claim 9 wherein each spacer has an overall configuration on a plane perpendicular to the axis of said channels of substantially one quarter of a square and four of said spacers are adapted to be secured together to form a single larger spacer having a substantially square cross section on a plane perpendicular to the axis of said channels.

11. The spacer of claim 10 wherein at least one small strain relief hole is removed from the sheet structure surrounding the openings.

References Cited

UNITED STATES PATENTS

| | | | |
|---|---|---|---|
| 3,137,637 | 6/1964 | Elliott | 176—78 |
| 3,166,481 | 1/1965 | Braum | 176—78 X |
| 3,228,854 | 1/1966 | Bekkering et al. | 176—78 |
| 3,281,327 | 10/1966 | Webb et al. | 176—78 X |
| 3,350,275 | 10/1967 | Venier et al. | 176—78 |
| 3,379,617 | 3/1968 | Andrews et al. | 176—78 |
| 3,442,763 | 5/1969 | Chetter et al. | 176—78 |

FOREIGN PATENTS

| | | | |
|---|---|---|---|
| 895,739 | 5/1962 | Great Britain | 176—78 |
| 1,105,238 | 7/1966 | Great Britain | 176—78 |

CARL D. QUARFORTH, Primary Examiner

G. G. SOLYST, Assistant Examiner

U.S. Cl. X.R.

176—76

UNITED STATES PATENT OFFICE
CERTIFICATE OF CORRECTION

PATENT NO. : 3,806,410
DATED : April 23, 1974
INVENTOR(S) : Charles C. Ripley

It is certified that error appears in the above-identified patent and that said Letters Patent are hereby corrected as shown below:

Fig. 6, the upper "64" should be changed to --67--, and numbers --51, 58, 59 and 60-- should be added to Fig. 6 per attached copy of Fig. 6.

Fig. 7, the upper "64" should be changed to --67-- per attached copy.

Fig. 8, add --86-- per attached copy of Fig. 8.

Fig. 12, add --29-- per attached copy of Fig. 12.

Column 1, line 5, there should be a notation that this patent is assigned to General Electric Company.

Column 3, line 61, "cam" should be --ram--.

Column 4, line 42, "spaced" should be --spacer--.

Column 5, line 58, "expension" should be --expansion--.

Column 5, line 60, "die-cuting" should be --die-cutting--.

Column 7, line 34, "member" should be --members--.

Signed and Sealed this twentieth Day of April 1976

[SEAL]

Attest:

RUTH C. MASON
Attesting Officer

C. MARSHALL DANN
Commissioner of Patents and Trademarks